US008366556B2

(12) United States Patent
Copeland

(10) Patent No.: US 8,366,556 B2
(45) Date of Patent: Feb. 5, 2013

(54) APPARATUS AND METHOD FOR LIMITING TORQUE TRANSMITTED BY ELONGATE DRIVING AND DRIVEN MEMBERS

(75) Inventor: Brian T. Copeland, Keene, NH (US)

(73) Assignee: Sonnax Industries, Inc., Bellows Falls, VT (US)

( * ) Notice: Subject to any disclaimer, the term of this patent is extended or adjusted under 35 U.S.C. 154(b) by 29 days.

(21) Appl. No.: 13/023,919

(22) Filed: Feb. 9, 2011

(65) Prior Publication Data
US 2012/0064981 A1 Mar. 15, 2012

Related U.S. Application Data

(60) Provisional application No. 61/381,759, filed on Sep. 10, 2010.

(51) Int. Cl.
F16D 9/06 (2006.01)
(52) U.S. Cl. .............................. 464/33; 403/2
(58) Field of Classification Search .................. 464/32, 464/33, 97, 182; 411/2–5; 403/2
See application file for complete search history.

(56) References Cited

U.S. PATENT DOCUMENTS

| 1,439,380 | A |   | 3/1921 | Ryding et al. |
| 2,388,186 | A |   | 6/1942 | Rowsey |
| 2,976,704 | A |   | 3/1961 | Kleinschmidt |
| 3,525,225 | A |   | 8/1970 | Yager et al. |
| 3,858,987 | A | * | 1/1975 | Kleinhans et al. ............ 403/2 |
| 3,927,537 | A | * | 12/1975 | Anderson et al. |
| 3,973,412 | A |   | 8/1976 | Miles |
| 3,986,754 | A | * | 10/1976 | Torrant |
| 3,999,404 | A |   | 12/1976 | Banki et al. |
| 4,204,589 | A |   | 5/1980 | Loker et al. |
| 5,651,629 | A |   | 7/1997 | Wall et al. |
| 5,795,231 | A | * | 8/1998 | Fukuda |
| 6,764,404 | B1 |   | 7/2004 | Gullickson et al. |
| 6,837,644 | B2 |   | 1/2005 | White et al. |
| 6,974,555 | B2 | * | 12/2005 | Holemans et al. |
| 7,237,663 | B2 |   | 7/2007 | Whitney |

FOREIGN PATENT DOCUMENTS
CA 2174259 12/2000

OTHER PUBLICATIONS http://www.sonnax.com. Sonnax Power Train Savers Online Catalog, 2009 Sonnax Industries, Inc.

* cited by examiner

Primary Examiner — Greg Binda
Assistant Examiner — Josh Skroupa
(74) Attorney, Agent, or Firm — Downs Rachlin Martin PLLC

(57) ABSTRACT

An apparatus and method for limiting torque transferred from an engine or motor to a drive shaft or other components. In some embodiments, the torque-limiting device has a spindle disposed within both coupling flanges to increase the resistance to radial forces and to maintain coaxial alignment of the flanges and attached drive shafts. In some embodiments, the axial spacing of bearings that enable rotation of the coupling flanges is based upon the diameter of the spindle. In another embodiment, torque-limiting devices that maintain coaxial alignment may be used to modify vehicle drive shafts to enable long distance towing for long durations at high speeds.

11 Claims, 5 Drawing Sheets

APPARATUS AND METHOD FOR LIMITING TORQUE TRANSMITTED BY ELONGATE DRIVING AND DRIVEN MEMBERS

RELATED APPLICATION DATA

This application claims the benefit of priority of U.S. Provisional Patent Application Ser. No. 61/381,759, filed Sep. 10, 2010, and titled "Apparatus and Method For Limiting Torque Transmitted by Elongate Driving and Driven Members," which application is incorporated by reference herein in its entirety.

FIELD OF THE INVENTION

The present invention generally relates to the field of torque-limiting devices releasably connected between two elongate members, such as drive shafts.

BACKGROUND

Torque-limiting devices (TLDs) are often installed in vehicles and other equipment to prevent drive shafts from transmitting damaging torque to components connected to the drive shafts such as differentials and transmissions. These devices also prevent torque from damaging the drive shaft itself. In practice, a TLD is installed between two segments of the drive shaft, each segment being connected to one of the two flanges of the TLD. The two flanges of the TLD are rotatable with respect to each other, unless coupled by at least one mechanical fuse. When coupled by a mechanical fuse(s), the two flanges of the TLD rotate in unison, thereby transferring torque from a driving shaft segment to a driven shaft segment. The mechanical fuse fractures when a torque threshold is exceeded, thereby decoupling the two flanges and drive shaft segments connected thereto. Because the two flanges are no longer coupled they rotate relative to each other, preventing excessive torque transfer to the drive shaft segments and components connected thereto.

While torque-limiting devices as described above are effective in certain situations, they are not designed to accommodate other important service conditions, such as extended use of the TLD without a mechanical fuse in place or in drive trains subject to large radial forces. For example, in some applications the drive shaft itself may be heavy, or the drive shaft may be transferring large amounts of torque which can induce significant radial loads due to shaft bending moment. The mass of the drive shaft and/or the magnitude of the torque-induced bending moment then exerts a force having a component perpendicular to the rotational axis of the TLD, i.e., a radial force. In this situation, the sustained radial force to the TLD can cause the bearings in the TLD to fail. A similar situation occurs when the vehicle is traveling over rough terrain; the impact of the vehicle moving over the rough terrain can result in the application of shocks to the drive shaft coupled to the TLD that exert a force having a radial force component. Some designs have attempted to solve these deficiencies by having a protruding cylinder on one flange centered on the axis of rotation that mates with a confronting recessed cylinder on the opposing flange. While this arrangement can provide added resistance to radial forces, the two flanges can rust together thereby increasing the maximum torque threshold and risking damage to the drive train and components connected thereto. These problems are compounded when the torque-limiting device is subjected to a high rate of rotation.

Torque-limiting devices are generally not designed to accommodate the important service condition of a high rate of rotation, commonly measured in revolutions per minute (RPM). At high RPM, particularly over periods longer than approximately 5-60 minutes, depending upon the design of the TLD, the bearings can over-heat, degrading the bearing lubricant, and ultimately leading to bearing, and TLD, failure. The combination of a radial force exerted on the torque-limiting device during use at high RPM can accelerate bearing and TLD failure.

SUMMARY OF THE DISCLOSURE

In one embodiment, a torque limiting device for limiting transmission of torque between driven and driving members connected to the device. The device includes a first coupling flange having a first portion dimensioned and configured to engage a first section of the driven member and a first central bore with a first longitudinal axis; a second coupling flange having a first portion dimensioned and configured to engage a second section of the driving member and a second central bore with a second longitudinal axis, wherein said second coupling flange confronts said first coupling flange and is positioned relative to said first coupling flange so that said first central bore is in communication with said second central bore and said first longitudinal axis is substantially coaxial with said second longitudinal axis; at least one mechanical fuse releasably connecting said first coupling flange to said second coupling flange, wherein said mechanical fuse is dimensioned and configured to fracture in response to application of torque thereto of a first magnitude; a spindle disposed within said first bore and said second bore, said spindle have a outside diameter D2; and first and second bearing assemblies disposed between said spindle and at least one of said first coupling flange and said second coupling flange so as to permit said spindle to rotate relative to said at least one of said first coupling flange and said second coupling flange, wherein said first bearing assembly is spaced from said second bearing assembly a distance D1, as measured along an axis extending parallel to said first longitudinal axis and said second longitudinal axis, further wherein the ratio of said distance D1 to said diameter D2, D1/D2, ranges from 1.5:1 to 2.5:1.

In another embodiment, a torque limiting device for limiting transmission of torque in a drive train connected to the device. The device includes a first coupling flange having a first portion dimensioned and configured to engage a first section of a drive train, a first face, and a first central bore with a first longitudinal axis; a second coupling flange having a first portion dimensioned and configured to engage a second section of the drive train, a second face confronting said first face, and a second central bore with a second longitudinal axis, wherein said second coupling flange is positioned relative to said first coupling flange so that said first central bore is in communication with said second central bore and said first longitudinal axis is substantially coaxial with said second longitudinal axis; at least one mechanical fuse releasably connecting said first coupling flange to said second coupling flange, wherein said mechanical fuse is dimensioned and configured to fracture in response to application of torque of a first magnitude, thereby disconnecting said first coupling flange from said second coupling flange so as to permit relative rotation therebetween; and wherein said device is sufficiently resistant to radial deflection that, following removal or fracture of said at least one mechanical fuse, application of a load of 100 pounds extending normal to said first and second longitudinal axes and intersecting said device at a location midway between said first face and said second face, as measured along an axis extending parallel to one of said first longitudinal axis and said second longitudinal axis, results in a deviation from coaxial alignment between said first longitudinal axis and said second longitudinal axis of no more than 0.15 degrees.

In yet another embodiment, a method of modifying a vehicle having a drive shaft with a torque limiting device to facilitate towing. The method includes providing a torque limiting device having a first coupling flange and a second coupling flange releasably secured to said first coupling flange by at least one mechanical fuse, wherein said first and second coupling flanges rotate as a unit prior to application to said at least one mechanical fuse of torque of a first magnitude and rotate relative to one another following application of torque of said first magnitude, further wherein said first coupling flange has a first longitudinal axis and said second coupling flange has a second longitudinal axis; connecting said first coupling flange to a first section of a drive shaft and connecting said second coupling flange to a second section of the drive shaft adjacent said first section so that said first longitudinal axis is coaxial with respect to said second longitudinal axis; removing or fracturing said at least one mechanical fuse so that said first coupling flange is free to rotate relative to said second coupling flange; and rotating the first section of the drive shaft relative to the second section of the drive shaft so that said first longitudinal axis remains coaxial with respect to said second longitudinal axis for more than one minute.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

DETAILED DESCRIPTION

Disclosed herein are apparatus and methods for making and using a torque-limiting device (TLD). TLDs are used to join two segments of a drive shaft in order to protect the drive shaft, and other drive train components, from torque damage. This protection is achieved by providing two coupling flanges, each flange mountable to either a driving shaft segment or a driven shaft segment. The coupling flanges are joined by a mechanical fuse that causes them to rotate in unison, thereby transferring torque from the engine or motor to the driving shaft, and through the entire drive train. However, because the mechanical fuse is designed to fracture at a pre-determined maximum torque, thereby decoupling the two coupling flanges of the TLD, the drive train is prevented from exceeding this maximum torque. Uses of the disclosed concepts include, but are not limited to, vehicles, industrial equipment, and heavy machinery using drive shafts.

Figure 1:
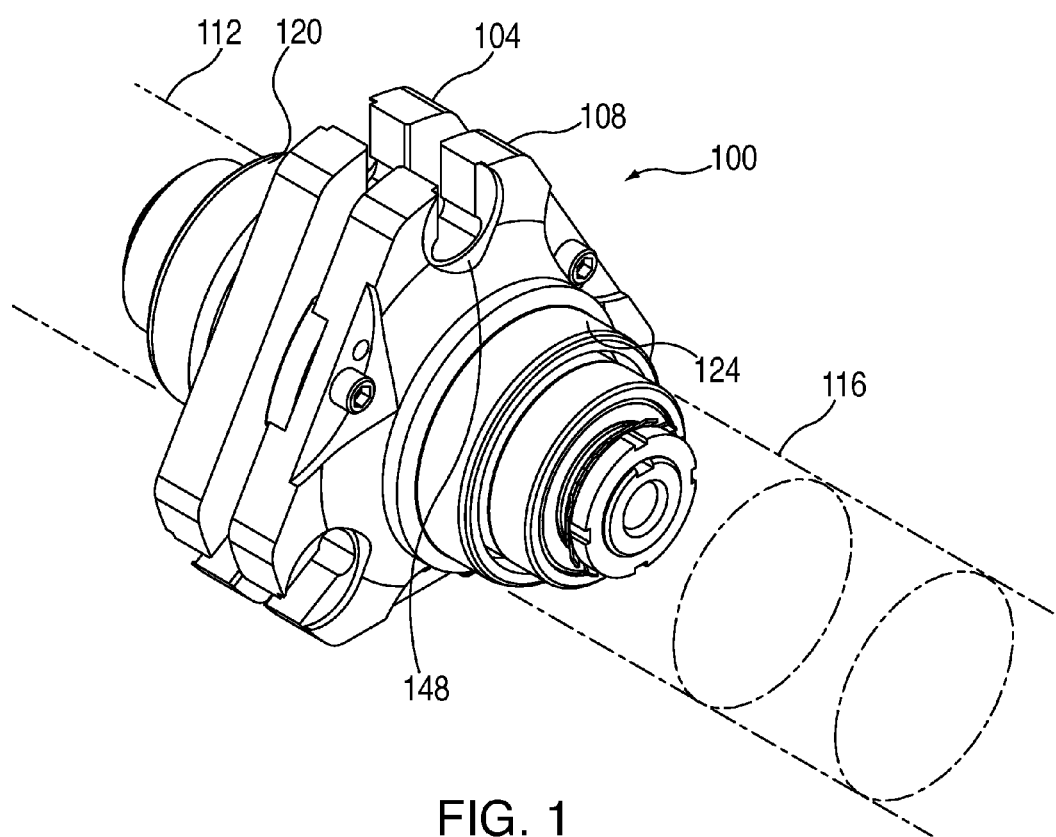
FIG. 1 is an isometric view of a torque-limiting device.

FIG. 1 shows an example of a TLD, TLD 100, which interrupts the transfer of damaging torque through a drive shaft by releasably securing rotating shaft segments together. TLD 100 has a first coupling flange 104 and a second coupling flange 108. In this example, a driven shaft segment 112 is attached to first coupling flange 104, and a driving shaft segment 116 is attached to second coupling flange 108. In one embodiment, TLD 100 receives driven shaft segment 112 on a first connecting seat 120 and driving shaft segment 116 on a second connecting seat 124. In this example, in order to properly connect to first connecting seat 120 and second connecting seat 124, driven shaft segment 112 and driving shaft segment 116 have hollow bores, or at least bored end regions in which the connecting seats are received. In some implementations, shaft segments 112 and 116 are connected to connecting seats 120 and 124 by welding. However in other implementations, other known methods of attaching shafts 112 and 116 to TLD 100 may be used.

Figure 2:
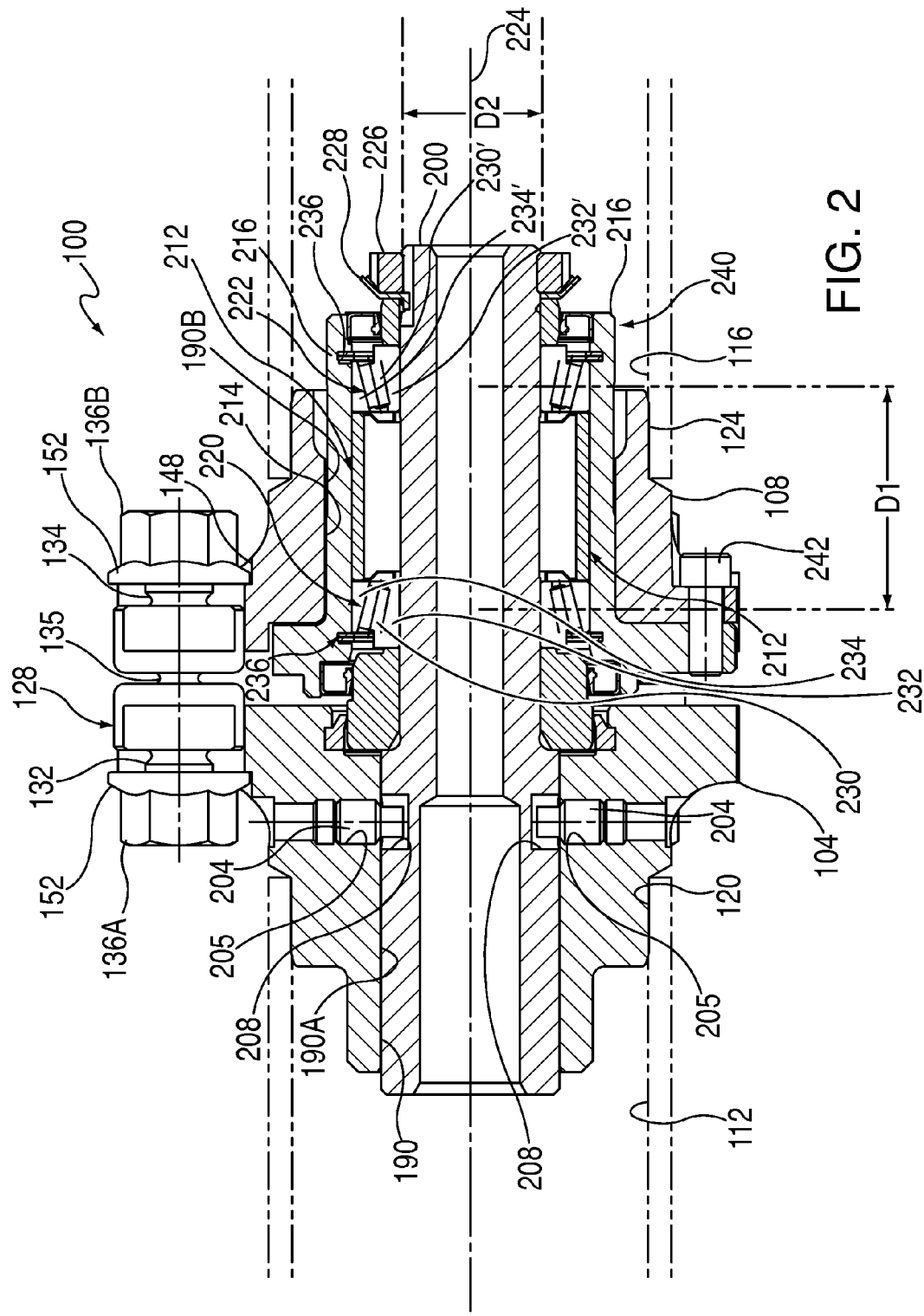
FIG. 2 is a longitudinal cross-sectional view of a torque-limiting device.

Referring to FIGS. 1 and 2, in the example of TLD 100 illustrated, torque is transferred between coupling flanges 104 and 108 when the coupling flanges are joined by one or more mechanical fuses 128. Mechanical fuse(s) 128 protects driven shaft segment 112 and driving shaft segment 116 from excessive torque by fracturing upon application of torque above a desired value. In one implementation, mechanical fuse 128 has opposing threaded ends 132 and 134 and a reduced-diameter necked region 135 that fractures upon exposure to the desired maximum torque. In this regard, the material from which mechanical fuses 128 are manufactured, the number of fuses used, and the diameter and other aspects of the configuration of the fuses, are selected based on the maximum torque that can be accommodated in the intended application for TLD 100. Mechanical fuse 128 is releasably secured within slot 144 (see FIG. 3) using flanged nuts 136A and B, thereby joining coupling flanges 104 and 108. However, other known designs of bolts, nuts, or releasable joining means, including those lacking a reduced diameter portion such as necked region 135, may be used as mechanical fuse 128. In one example, mechanical fuse 128 may be have an outside diameter in the range 1.25-2.00 inches, and overall length of 3.25-4.00 inches, with the diameter of necked region 135, if provided, ranging from 0.15-0.62 inches. As those skilled in the art will appreciate, the invention encompasses mechanical fuses 128 have dimensions other than those listed immediately above as a function of the overall dimensions and intended application for the TLD 100.

Figure 3:
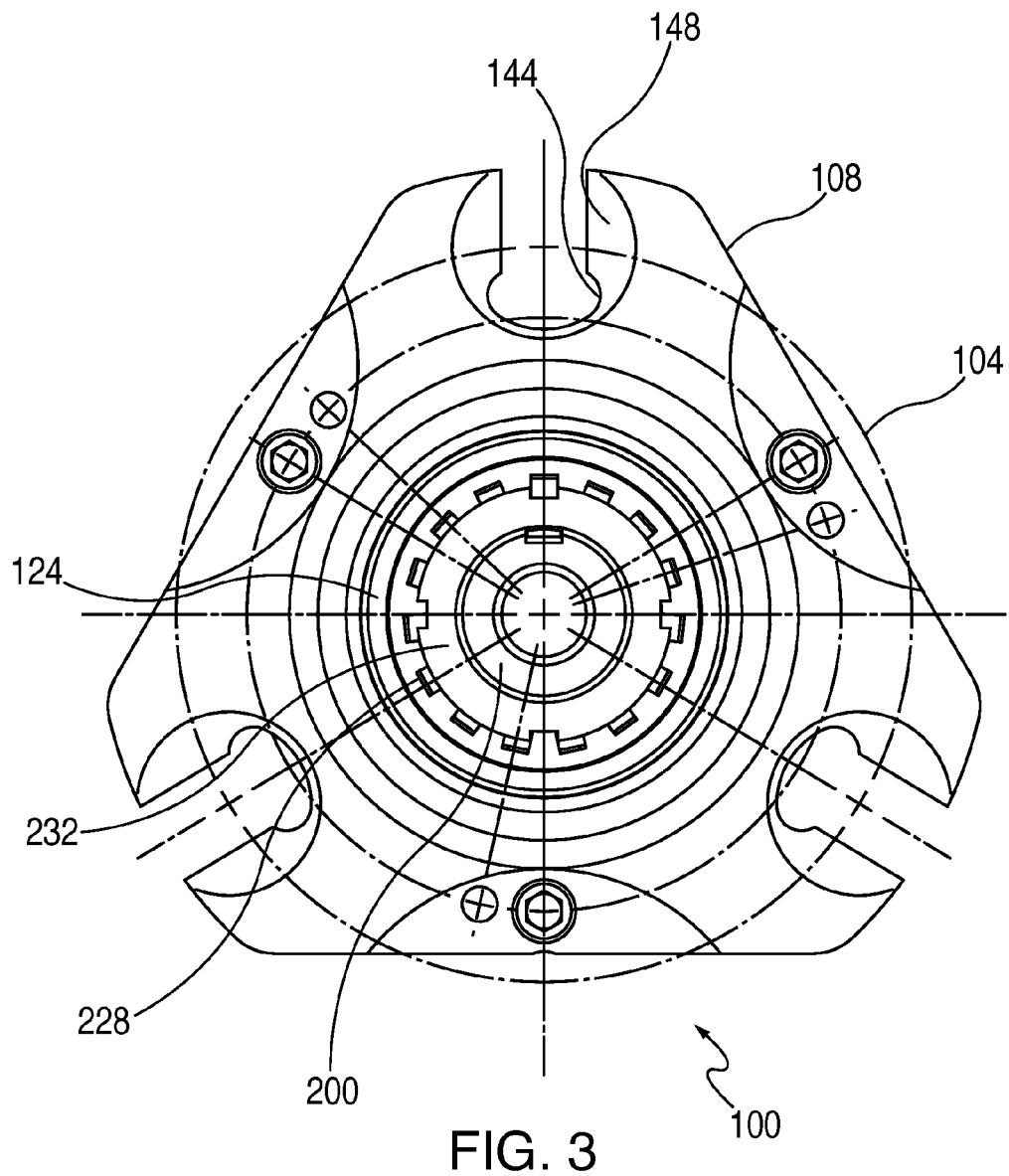
FIG. 3 is an end view of the torque-limiting device of FIG. 1.

Referring to FIGS. 1-3, in the embodiment of TLD 100 shown in FIG. 1, coupling flanges 104 and 108 each have three circumferentially spaced slots 144 that are typically positioned an equal distance from adjacent slots, i.e., 120 degrees in this example, through which the flanges are coupled using mechanical fuses 128. The number and location of slots 144 and the corresponding mechanical fuses 128 may be varied depending on the application. While in many applications three or more mechanical fuses 128 are employed, the invention encompasses the use of one or two mechanical fuses as well. Once mechanical fuses 128 join coupling flanges 104 and 108, torque below the fracture threshold of the mechanical fuses will be transferred from driven shaft segment 112 to driving shaft segment 116.

In one example of TLD 100, coupling flanges 104 and 108 each include a recess 148 (FIG. 1) adjacent at least one side of slot 144. In this example, the depth of recess 148 is approximately equal to the thickness of flange 152 on flanged nuts 136A and B, and is otherwise sized and configured to receive the flanges, as illustrated in FIG. 2.

With reference to FIG. 2, TLD 100 includes a central bore 190, a portion of which is located in coupling flange 104 and the other portion of which is located in coupling flange 108. In this regard, a first portion 190A of central bore 190 is located in first coupling flange 104, and a second portion 190B of central bore 190 is located in second coupling flange 108. Portions 190A and 190B, together with the space in between the bores, form central bore 190. Spindle 200 is disposed within central bore 190. In this example, spindle 200 may be hollow and may be releasably fixed within central bore 190 to coupling flange 104 using dog-point set screws 204 which are disposed within radial bore 205 in first coupling flange 104. Dog-point set screws 204 releasably fix spindle 200 in selected axial relationship with central bore 190 by positioning an end portion of the screw disposed within set screw channel 208 in spindle 200. Positioning spindle 200 may be releasably fixed within bore 190 by other means known to the skilled artisan, or in some applications may be permanently fixed within bore 190.

The inclusion of spindle 200 in TLD 100 contributes to the ability of the TLD to withstand deflection by radial forces by, among other factors, adding rigidity to the TLD. Certain known prior art torque disconnect assemblies lack a spindle, and therefore are susceptible to significant radial deflection even when the mechanical fuses are intact. Spindle 200 provides this radial support to TLD 100 whether or not coupling flanges 104 and 108 are joined by mechanical fuses 128. That is, spindle 200 provides resistance of TLD 100 to deflection due to radial forces during operation even when coupling flanges 104 and 108 are disconnected and able to rotate with respect to one another. One factor contributing to the resistance provided by spindle 200 is outside diameter D2. By increasing the outside diameter D2 of spindle 200 to the extent feasible within the design parameters of TLD 100, the ability of TLD 100 to resist radial forces increases approximately exponentially with respect to increases in diameter D2. In one example, diameter D2 is approximately 1.5 inches and the diameter of driven shaft 112 and driving shaft 116 is 4.5 inches. This ability to resist radial deflection present in TLD 100 is present in TLD 400 as well, or any TLD embodying the concepts of the disclosure.

TLD 100, in one embodiment, includes bearing assembly 212, which enables relative rotation between second coupling flange 108 and spindle 200, as discussed more below. Bearing assembly 212 is received in bore 214 in second coupling flange 108. In one implementation, bearing assembly 212 is disposed in a bearing cartridge housing 216 positioned in bore 214. Bearing assembly 212 may include two bearing races, races 220 and 222, which are axially spaced apart relative to longitudinal axis 224 of TLD 100 as discussed further below. Bearing race 220 includes bearings 230, inner bearing seat 232 and outer bearing seat 234, with bearings 230 rotating against the inner and outer bearing seats. Similarly, bearing race 222 includes bearings 230', inner bearing seat 232' and outer bearing seat 234'. Inner bearing seats 232 and 232' are press-fit onto spindle 200 in the example of TLD 100 shown in FIG. 2, although in other implementations the inner bearing seats may be otherwise affixed to the spindle, or may be positioned on the spindle with a loose or even sliding fit. Outer bearing seats 234 and 234' may be secured to bearing cartridge housing 216 by retaining rings 236, via press fit, or using other techniques, or may be sized to engage bearing cartridge housing 216 with a loose or even sliding fit.

Bearing assembly 212, including the bearing races, bearings, seats and other components thereof, along with bearing cartridge housing 216, together form a bearing cartridge 240 that may be designed to be permanently affixed to second coupling flange 108, or releasably secured to the second coupling flange, as indicate in FIG. 2. In this regard, bearing cartridge 240 may be releasably secured to second coupling flange 108 via one or more fasteners, such as bolt 242.

Bearing cartridge 240, in one implementation, is held in place by an interference fit between bearing assembly 212 and spindle 200. As further assurance that bearing assembly 212 remains in selected axial relationship to spindle 200, the latter may be held in place at one end by dog-point set screws 204 and at the other end by lock nut 226 and locking washer 228 that engages bearing assembly 212.

Tapered roller bearings are used for bearing races 220 and 222 in the example illustrated in FIG. 2. Needle bearings (discussed more below in connection with FIG. 5) and other bearing types known in the art may, alternatively, be used in bearing assembly 212.

Proper separation and placement of bearings may be important to prevent bearing wear and failure during service, and to enable the operation of bearings for longer periods of time. The spacing D1 between bearings 230 and 230' (measured at the mid-point) in bearing assembly 212 may be selected based on the diameter D2 (see FIG. 4) of spindle 200. In this regard, in order to maintain coaxial alignment during service and during application of radial forces, thereby improving the ability of TLD 100 to withstand radial forces, it has been determined that a D1/D2 ratio of 1.5:1 to 2.5:1 provides satisfactory results. In many intended applications, a D1/D2 ratio below 1.5:1 does not provide optimal results.

Figure 4:
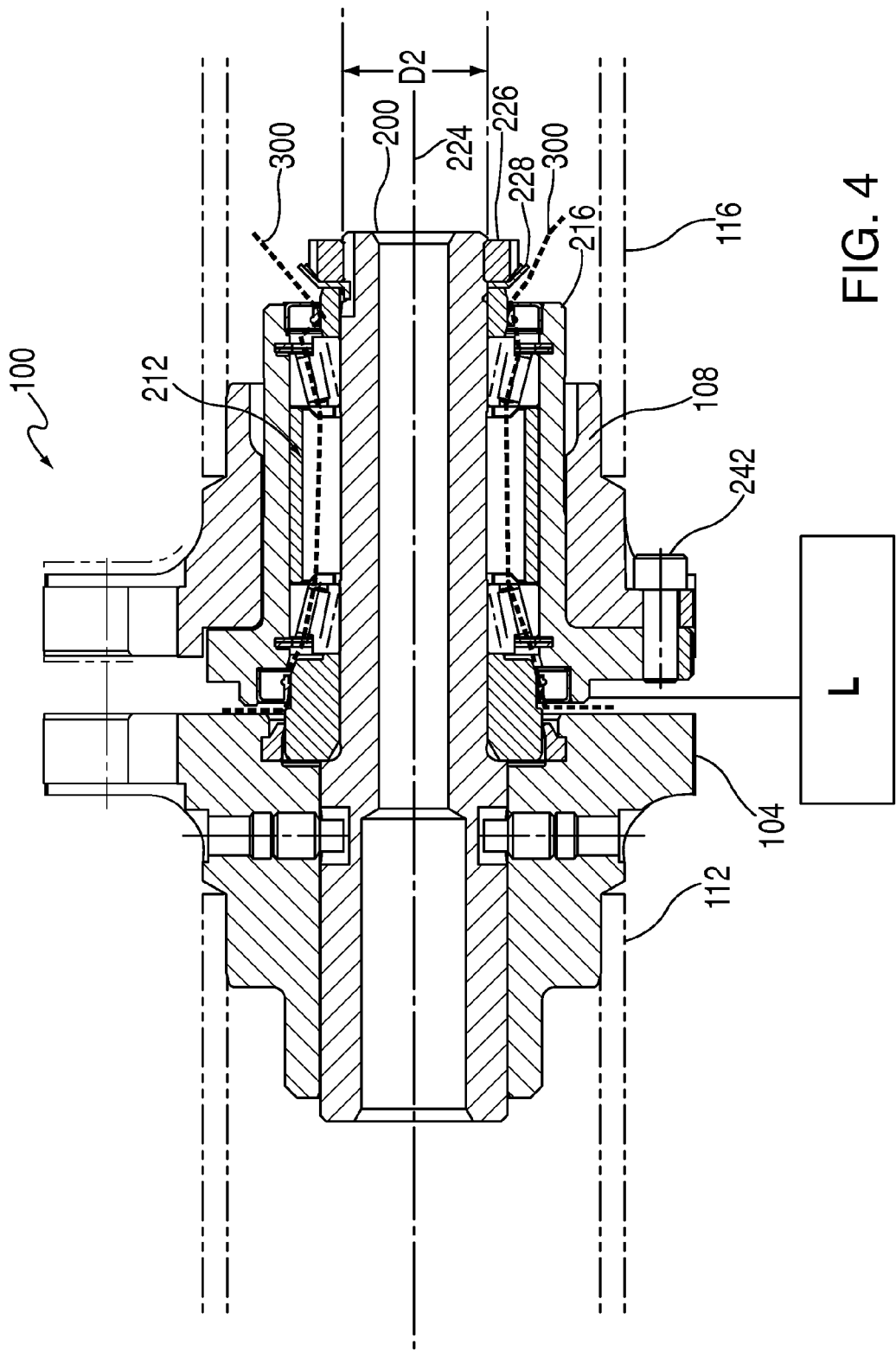
FIG. 4 is a longitudinal cross-sectional view similar to FIG. 2, except that lines have been added to show relative rotation between components of the device.

FIG. 4 illustrates relative rotation of components during operation of TLD 100. During one mode of operation of TLD 100, first coupling flange 104 and second coupling flange 108 rotate in unison because they are joined by mechanical fuses 128. When mechanical fuses 128 fracture, second coupling flange 108 then no longer rotates in unison with first coupling flange 104, and instead rotates about spindle 200. This rotation is facilitated by bearing assembly 212. As illustrated in FIG. 4, those components radially outward of bold line 300, including second coupling flange 108 and portions of bearing assembly 212, rotate independently from first coupling flange 104 and about spindle 200 following fracturing of mechanical fuses 128.

After a failure of mechanical fuse 128, bearing cartridge 216 may, optionally, be replaced. The replacement may be accomplished by first removing some of TLD 100 components. First, bolt 242 is exposed and removed from TLD 100. After removal of bolt 242, locknut 226 and locking washer 228 are removed. Bearing housing cartridge 216 may then be removed. Tools may be required to accomplish any or all of these steps given the possible geometric or physical constraints. Once bearing cartridge 216 is replaced, the foregoing process is reversed to re-secure TLD 100.

Figure 5:
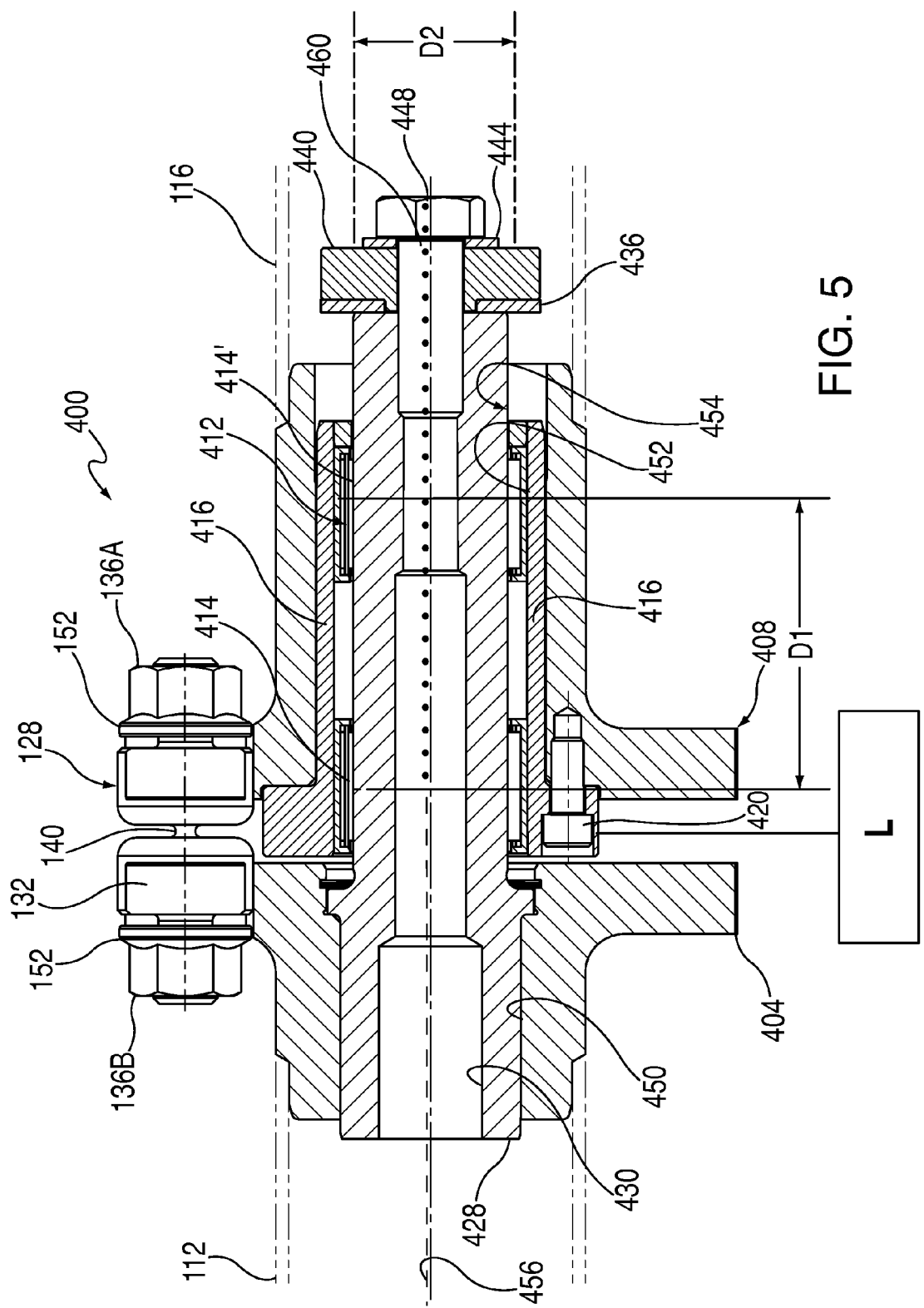
FIG. 5 is a longitudinal cross-sectional view of an alternative embodiment of a torque-limiting device.

FIG. 5 shows TLD 400, which illustrates an alternative embodiment of the concepts disclosed above. In this example, driven shaft segment 112 is connected to a first coupling flange 404, and driving shaft segment 116 is connected to a second coupling flange 408. First coupling flange 404 and second coupling flange 408 are joined by mechanical fuses 128 so as to transfer torque below a critical value to driven shaft segment 112 from driving shaft segment 116. As mentioned previously, above the critical torque value, mechanical fuse 128 fractures thereby de-coupling first coupling flange 404 from second coupling flange 408 and preventing excessive torque from being transferred between shaft segments 112 and 116.

In the example depicted in FIG. 5, TLD 400 includes a needle bearing assembly 412 that includes axially spaced needle bearings 414 and 414'. In this example, bearing assembly 412 is positioned in a bearing cartridge 416. Like bearings 230 and 230', needle bearings may be axially spaced from one another a distance D1, as measured at the axial midpoint thereof. Bearing cartridge 416 may be secured to second coupling flange 408 via one or more positioning screws 420. While needle bearings 414, 414' are used in this example, other bearing types may also be used with TLD 400. TLD 400 also includes a spindle 428, optionally having bore 430, that is received in central bore 450 in first coupling flange 404 and second coupling flange 408, with bearing cartridge 416 being interposed between the central bore and the spindle in this implementation. The diameter of the portion of spindle 428 proximate bearing assembly 412 is identified as D2 in FIG. 5. As in the prior example of TLD 100, in some examples of TLD 400 the ratio of the axial spacing D1 between needle bearings 414 and 414' and the diameter D2 of the portion of spindle 428 proximate the bearings may range from 1.5:1 to 2.5:1. Spindle 428 is positioned and maintained in selected axial relation to first coupling flange 404 and second coupling flange 408 using a thrust washer 436, a stop ring 440, and a terminal washer 444 connected to the spindle by a threaded bolt 448 adjacent to the spindle. While these components are used to position spindle 428, other examples may use other methods and components to position the spindle.

With continuing reference to FIG. 5, first coupling flange 404 includes a central bore 450 and second coupling flange 408 includes a central bore 452. Bore 450 is a continuous opening through first coupling flange 404 and has a longitudinal axis 456 that is coaxial with longitudinal axis 448. Similarly, bore 452 is a continuous opening through second coupling flange 408 and has a longitudinal axis 460 that is coaxial with longitudinal axis 448. When first coupling flange 404 and second coupling flange 408 are proximate one another, for example when TLD 400 is assembled, the two flanges and their respective central bores 450 and 452 are in communication and form central elongate opening 454. When the central bores 450 and 452 are in communication, the two longitudinal axes 456 and 460 are coaxial with each other aHand also coaxial with longitudinal axis 448.

Turning now to FIG. 4, the resistance to radial forces applied to TLD 100 can be measured by applying a known radial force or load L to TLD 100 at a location midway between the ends of driven and driving shaft segments 112 and 116 secured to TLD 100, and measuring the resultant radial deflection of spindle 200, the test being performed when mechanical fuses 128 are fractured or not present. The number of degrees of radial deflection of spindle 200 is a result of, among other things, the materials used to manufacture the spindle, its outside diameter D2 and the presence or absence of a central bore in the spindle. In one example of TLD 100, the radial deflection with respect to longitudinal axis 224 as a consequence of the application of a radial load of 100 pounds applied midway between the ends of shafts 112 and 116 secured to the TLD, with the overall end-to-end length of shafts 112, 116 and TLD 100 being 50 inches, was about 0.030 inches and about 0.069 degrees relative to the unloaded position. Similarly, in the example of TLD 400, under identical test conditions spindle 428 deflected relative to longitudinal axis 456 about 0.037 inches and about 0.085 degrees. The extent of radial deflection will vary to some extent as a function of the end-to-end length of shafts 112, 116 and the TLD connected thereto, and as a function of the intended application of the TLD, radial deflections of up to about 0.10 inches and about 0.15 degrees are generally satisfactory. These deviations from perfectly coaxial alignment are sufficiently minor that even after fracture or removal of mechanical fuses 128, substantially coaxial alignment is maintained between shafts 112 and 116.

The ability of TLD 100, and other examples employing the disclosed concepts, to withstand radial forces enables the TLD to maintain a high degree of coaxial alignment between first coupling flange 104 and second coupling flange 108 even in the absence of mechanical fuse 128. By maintaining this substantially coaxial alignment, bearing assembly 212 operates within its intended service conditions. As a result, driven shaft 112 and driving shaft 116 may be permitted to rotate relative to one another at high speeds, e.g., 3000-4000 RPMs for extended periods of time, e.g., 16 hours.

In addition to resisting deflection due to radial forces, spindles exemplified by spindles 200 and 428 cure a design defect present in certain known torque-limiting devices. As discussed previously, other designs attempt to improve radial force resistance using mating positive and negative cylinders centered on the axis of rotation of the coupling flanges. While this arrangement may provide resistance to radial forces applied to the torque-limiting device or the shaft, the mating cylinders may corrode at their interface, thereby bonding them together. Because the torque required to break the bond formed by the corrosion often exceeds the torque required to break the mechanical fuse, designs prone to corrosive bonding may defeat the purpose of torque-limiting device, i.e., to protect the shaft and associated components from excessive torque. Because spindle 200 is physically distinct from first and second coupling flanges 104 and 108, and because the coupling flanges are spaced from one another, the risk of bonding through corrosion of the coupling flanges is essentially eliminated in TLD 100 and TLD 400. As a consequence, TLDs of the present disclosure cure design deficiencies present in other torque-limiting devices. This concept may be extended to other TLD examples embodying the concepts of the above disclosure. While other designs attempt to reduce the risk of corrosive bonding by separating the coupling flanges and increasing the lengths of the positive and negative mating cylinders, this approach sacrifices resistance to radial forces.

Furthermore, use of, for example, spindle 200 or spindle 428 cures a limitation of certain other torque-limiting devices. In certain other TLDs lacking a central spindle, coaxial alignment may be lost after fracturing of the mechanical fuses because the coupling flanges are no longer held in coaxial alignment. Because coaxial alignment is lost, the ends of the drive shaft segments terminated by coupling flanges may rotate in a circle or an ellipse of increasing radius as alignment further degrades. This may cause further damage to the drive shaft or the vehicle itself. Unlike these designs, TLD 100 and TLD 400 are examples of designs that maintain substantially coaxial alignment of the two halves of the devices after fracturing of mechanical fuses 128. Therefore, the risk of shaft or vehicle damage after fracturing of the mechanical fuses 128 is substantially reduced.

One example where TLD 100 may be advantageously employed is that of a logging truck (although other examples are equally applicable, e.g., garbage trucks). Logging trucks typically carry heavy loads that can exert large radial forces on the drive shaft of the vehicle. Furthermore, logging trucks regularly travel poorly maintained roads that further increase the radial loads on the drive shaft because of the sudden shocks occurring when the truck travels over a rough road surface. In these situations, mechanical fuses 128 in TLD 100 prevent the transfer of excess torque to the drive shaft as discussed previously. TLD 100 also protects other components of the drive train after fracturing of mechanical fuses 128 because coaxial alignment is maintained by spindle 200.

Because coaxial alignment is maintained, the ends of the drive shaft segments are not damaged by, for example, being dragged or by striking the underside of the vehicle or the ground.

The insertion into a drive shaft of a TLD embodying the concepts of the above disclosure may be performed conveniently and with little risk of damage to the TLD. For example, spindle 200 and bearing assembly 212 may be removed from TLD 100 prior to welding of coupling flanges 104 and 108 to drive shaft segments 112 and 116, respectively. Removal of these components from TLD 100 prior to welding removes the risk of welding-generated heat damaging spindle 200 or bearing assembly 212, or otherwise affecting the TLD's performance. The components are removed by releasing dog-point set screws 204 and then extracting spindle 200 from first coupling flange 204. Following this step, spindle 200, and bearing cartridge 240 can be removed from TLD 100. Thereafter, driven shaft 112 can be secured to first coupling shaft 104 and driving shaft 116 can be secured to second coupling shaft 108. Finally, TLD 100 may be reassembled in reverse order to that described above.

Similarly, in the example of TLD 400, bearing cartridge 416 and spindle 428 may be removed prior to attachment of the TLD to drive shaft segments 112 and 116. In this example, after mechanical fuse 128 is removed, second coupling flange 408 may be shifted to expose the head of positioning screws 420. Once positioning screws 420 are removed, spindle 428 bearing cartridge 416 may be removed from TLD 400.

Once coupling flanges 404 and 408 have been welded to drive shaft segments 112 and 116, spindle 200, spindle 428 and bearing cartridge 416 may be reinserted into TLD 400 by reversing the removal steps discussed above.

While TLD 100, TLD 400, and other embodiments of the concepts disclosed may be used to prevent excessive torque from being transferred through a drive shaft, other applications exist for these devices. For example, embodiments of the disclosed concepts may be used to install TLD 100 or TLD 400 in a drive shaft of a vehicle, enabling it to be towed without risking damage to the drive train. In this example, the TLD may be installed either at the vehicle factory or as an "after-market" modification by a subsequent user of the vehicle. To enable safe towing, mechanical fuses 128 are first removed or disabled, thereby enabling the relative rotation of coupling flanges 104 and 108. Once coupling flanges 104 and 108 are able to rotate with respect to each other, a vehicle having a TLD embodying the concepts disclosed installed in a drive shaft may be towed for extended periods of time, e.g., 16 hours, at relatively high shaft speeds, e.g., speeds in the range of 2500-4000 RPM. These speeds and durations of use are possible because of the disclosed concepts enabling the TLD to maintain coaxial alignment during extended use, and regardless of whether mechanical fuse 128 is fractured.

While the present disclosure includes examples directed toward drive shafts, it will be understood by those skilled in the art that the present disclosure is equally applicable to applications involving coupled driving and driven members.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. A torque limiting device for limiting transmission of torque between driven and driving members connected to the device, the device comprising:

a first coupling flange having a first portion dimensioned and configured to engage a first section of the driven member and a first central bore with a first longitudinal axis;

a second coupling flange having a first portion dimensioned and configured to engage a second section of the driving member and a second central bore with a second longitudinal axis, wherein said second coupling flange confronts said first coupling flange and is positioned relative to said first coupling flange so that said first central bore is in communication with said second central bore and said first longitudinal axis is substantially coaxial with said second longitudinal axis;

at least one mechanical fuse releasably connecting said first coupling flange to said second coupling flange, wherein said mechanical fuse is dimensioned and configured to fracture in response to application of torque thereto of a first magnitude;

a spindle disposed within said first bore and said second bore, said spindle have a outside diameter D2; and first and second bearing assemblies disposed between said spindle and at least one of said first coupling flange and said second coupling flange so as to permit said spindle to rotate relative to said at least one of said first coupling flange and said second coupling flange, wherein said first bearing assembly is spaced from said second bearing assembly a distance D1, as measured along an axis extending parallel to said first longitudinal axis and said second longitudinal axis, further wherein the ratio of said distance D1 to said diameter D2, D1/D2, ranges from 1.5:1 to 2.5:1.

2. A torque limiting device of claim 1, wherein said D1/D2 ratio is about 2.0:1.

3. A torque limiting device of claim 1, wherein said first and second bearing assemblies each include needle bearings.

4. A torque limiting device of claim 1, wherein said first and second bearing assemblies each include tapered roller bearings.

5. A torque limiting device of claim 1, wherein said spindle is hollow.

6. A torque limiting device of claim 1, wherein said first coupling flange includes a first face and said second coupling flange includes a second face confronting said first face and spaced a first distance from said first face.

7. A torque limiting device of claim 6, wherein said first distance ranges from 0.5-0.625 inches.

8. A torque limiting device of claim 6, wherein said device is sufficiently resistant to radial deflection that, following removal or fracture of said at least one mechanical fuse, application of a load of 100 pounds extending normal to said first and second longitudinal axes and intersecting said device at a location midway between said first face and said second face, as measured along an axis extending parallel to one of said first longitudinal axis and said second longitudinal axis, results in a deviation from coaxial alignment between said first longitudinal axis and said second longitudinal axis of no more than 0.15 degrees.

9. A device according to claim 8, wherein said at least one mechanical fuse includes a plurality of mechanical fuses, each dimensioned and configured so that each one of said plurality of mechanical fuses fractures in response to application of torque thereto of said first magnitude.

10. A torque limiting device for limiting transmission of torque in a drive train connected to the device, the device comprising:

a first coupling flange having a first portion dimensioned and configured to engage a first section of a drive train, a first face, and a first central bore with a first longitudinal axis;

a second coupling flange having a first portion dimensioned and configured to engage a second section of the drive train, a second face confronting said first face, and a second central bore with a second longitudinal axis, wherein said second coupling flange is positioned relative to said first coupling flange so that said first central bore is in communication with said second central bore and said first longitudinal axis is substantially coaxial with said second longitudinal axis;

at least one mechanical fuse releasably connecting said first coupling flange to said second coupling flange, wherein said mechanical fuse is dimensioned and configured to fracture in response to application of torque of a first magnitude, thereby disconnecting said first coupling flange from said second coupling flange so as to permit relative rotation therebetween; and wherein said device is sufficiently resistant to radial deflection that, following removal or fracture of said at least one mechanical fuse, application of a load of 100 pounds extending normal to said first and second longitudinal axes and intersecting said device at a location midway between said first face and said second face, as measured along an axis extending parallel to one of said first longitudinal axis and said second longitudinal axis, results in a deviation from coaxial alignment between said first longitudinal axis and said second longitudinal axis of no more than 0.15 degrees.

11. A device according to claim 10, wherein said at least one mechanical fuse includes a plurality of mechanical fuses, each dimensioned and configured so that each one of said plurality of mechanical fuses fractures in response to application of torque thereto of said first magnitude.

* * * * *